(12) United States Patent
Katagata et al.

(10) Patent No.: US 9,790,905 B2
(45) Date of Patent: Oct. 17, 2017

(54) FUEL INJECTION CONTROL DEVICE

(71) Applicant: KEIHIN CORPORATION, Shinjuku-ku, Tokyo (JP)

(72) Inventors: Masahiro Katagata, Shioya-gun (JP); Yusuke Sugimoto, Shioya-gun (JP)

(73) Assignee: KEIHIN CORPORATION, Tokyo (JP)

( * ) Notice: Subject to any disclaimer, the term of this patent is extended or adjusted under 35 U.S.C. 154(b) by 143 days.

(21) Appl. No.: 14/678,181

(22) Filed: Apr. 3, 2015

(65) Prior Publication Data

US 2015/0285169 A1 Oct. 8, 2015

(30) Foreign Application Priority Data

Apr. 7, 2014 (JP) ................................. 2014-078438

(51) Int. Cl.

| | |
|---|---|
| *F02D 41/00* | (2006.01) |
| *F02M 51/00* | (2006.01) |
| *F02D 19/02* | (2006.01) |
| *F02D 41/30* | (2006.01) |
| *F02M 21/02* | (2006.01) |
| *F02D 41/20* | (2006.01) |

(52) U.S. Cl.
CPC ......... *F02M 51/005* (2013.01); *F02D 19/024* (2013.01); *F02D 41/0027* (2013.01); *F02D 41/3005* (2013.01); *F02M 21/0254* (2013.01); *F02D 2041/2013* (2013.01); *F02D 2041/2075* (2013.01)

(58) Field of Classification Search
CPC .... F02D 2041/2013; F02D 2041/2075; F02M 51/005; F02M 21/0287
See application file for complete search history.

(56) References Cited

U.S. PATENT DOCUMENTS

| | | | | |
|---|---|---|---|---|
| 4,141,326 A | * | 2/1979 | Wolber | F02B 43/10 |
| | | | | 123/684 |
| 4,489,699 A | * | 12/1984 | Poehlman | F02B 69/04 |
| | | | | 123/525 |
| 5,156,232 A | * | 10/1992 | Muroya | B60K 28/04 |
| | | | | 180/273 |
| 5,593,430 A | * | 1/1997 | Renger | A61N 1/36585 |
| | | | | 607/18 |

(Continued)

FOREIGN PATENT DOCUMENTS

JP 2013148006 A * 8/2013 ........... F02D 19/061

*Primary Examiner* — Sizo Vilakazi
*Assistant Examiner* — Kevin R Steckbauer
(74) *Attorney, Agent, or Firm* — Cantor Colburn LLP

(57) ABSTRACT

A fuel injection control device which is provided with an input terminal to which a first pulse signal for driving a liquid fuel injection valve is input and an output terminal from which the first pulse signal is output, and converts the first pulse signal which is input from the input terminal to a second pulse signal for driving a gaseous fuel injection valve, includes: a P-channel field-effect transistor interposed in a wiring which connects the input terminal and the output terminal; a switching control section which performs switching control between an ON state and an OFF state of the field-effect transistor; and a gate drive circuit which maintains the field-effect transistor in the ON state in a case where power supply to the switching control section is not performed.

5 Claims, 3 Drawing Sheets

(56) References Cited

U.S. PATENT DOCUMENTS

| | | | | |
|---|---|---|---|---|
| 6,005,763 A * | 12/1999 | North | | F02D 41/20 123/490 |
| 6,014,685 A * | 1/2000 | Marshall | | G06G 7/20 708/801 |
| 6,216,530 B1 * | 4/2001 | Shimizu | | F02P 17/12 73/114.08 |
| 6,222,367 B1 * | 4/2001 | Shimizu | | F02P 17/12 324/378 |
| 6,687,597 B2 * | 2/2004 | Sulatisky | | F01N 3/20 123/480 |
| 7,167,030 B2 * | 1/2007 | Kitagawa | | H03K 5/08 324/527 |
| 7,273,038 B2 * | 9/2007 | Hayakawa | | F02D 41/20 123/478 |
| 7,327,052 B2 * | 2/2008 | Korsten | | H04L 12/10 307/125 |
| 7,508,315 B2 * | 3/2009 | Zimmermann | | G08B 21/185 320/162 |
| 8,203,320 B2 * | 6/2012 | Leman | | H02M 3/155 323/282 |
| 8,412,439 B2 * | 4/2013 | Warner | | F02D 41/0027 123/304 |
| 8,686,704 B2 * | 4/2014 | Ishii | | H02M 3/156 323/284 |
| RE45,990 E * | 4/2016 | Angelin | | H05B 33/0818 |
| 2003/0187567 A1 * | 10/2003 | Sulatisky | | F01N 3/20 701/104 |
| 2005/0212568 A1 * | 9/2005 | Kitagawa | | H03K 5/08 327/112 |
| 2006/0137661 A1 * | 6/2006 | Hayakawa | | F02D 41/20 123/499 |
| 2007/0080905 A1 * | 4/2007 | Takahara | | G09G 3/3233 345/76 |
| 2007/0103327 A1 * | 5/2007 | Zimmermann | | G08B 21/185 340/652 |
| 2009/0024301 A1 * | 1/2009 | Volpato | | F02D 19/0647 701/103 |
| 2010/0171475 A1 * | 7/2010 | Leman | | H02M 3/155 323/282 |
| 2010/0289473 A1 * | 11/2010 | Ishii | | H02M 3/156 323/284 |
| 2011/0276253 A1 * | 11/2011 | Kjar | | F02D 19/0615 701/103 |
| 2011/0288745 A1 * | 11/2011 | Warner | | F02D 41/0027 701/103 |
| 2012/0291758 A1 * | 11/2012 | Saito | | F02D 19/024 123/515 |
| 2015/0192082 A1 * | 7/2015 | Guerreiro | | F02D 41/14 123/456 |

* cited by examiner

FUEL INJECTION CONTROL DEVICE

CROSS-REFERENCE TO RELATED APPLICATION

The present invention claims priority under 35 U.S.C. §119 to Japanese Application No. 2014-078438, filed on Apr. 7, 2014, the entire content of which is incorporated herein by reference.

BACKGROUND OF THE INVENTION

Field of the Invention

The present invention relates to a fuel injection control device.

Description of Related Art

In the related art, as a technique of improving the fuel economy performance and the environmental protection performance of a vehicle, a bi-fuel system is known which selectively switches between liquid fuel such as gasoline and gaseous fuel such as compressed natural gas (CNG) and supplies the selected fuel to a single engine. In order to reduce development costs, there is a case where the bi-fuel system is constructed in a form in which a new gas injection system is added to an existing gasoline injection system.

Japanese Unexamined Patent Application, First Publication No. 2013-148006 discloses a bi-fuel system in which with respect to an existing electronic control device which outputs a first pulse signal for controlling the injection quantity of gasoline, a new electronic control device which converts the first pulse signal to a second pulse signal suitable for gaseous fuel is provided. In addition, the first pulse signal is a pulse signal which has a pulse width corresponding to the injection quantity of gasoline and is used in order to drive a gasoline injector, and the second pulse signal is a pulse signal which has a pulse width suitable for gaseous fuel and is used in order to drive a gas injector.

Specifically, in the bi-fuel system disclosed in Japanese Unexamined Patent Application, first Publication No. 2013-148006, in the new electronic control device, a normally-on switch is provided between an input terminal and an output terminal of the first pulse signal and performs the following control, thereby avoiding stopping of fuel supply to an engine; at the time of injection of gasoline, maintaining the switch in an ON state and supplying the first pulse signal from the input terminal to a gasoline injector through the switch and the output terminal, and at the time of injection of gaseous fuel, switching the switch to an OFF state, making the first pulse signal from the input terminal branch at a stage previous to the switch, converting the branched first pulse signal to the second pulse signal, and supplying the second pulse signal to a gas injector.

SUMMARY OF THE INVENTION

Incidentally, in Japanese Unexamined Patent Application, First Publication No. 2013-148006, the normally-on switch is provided between the input terminal and the output terminal in the new electronic control device, thereby controlling whether or not the first pulse signal is supplied to the gasoline injector. Here, in a case where a mechanical switch such as a relay is used as the above-described switch, in order to prevent contact failure, it is necessary to use an expensive switch with measures of applying siloxane thereto, and thus there is a problem in that a cost rises.

Therefore, if an electronic switch such as a semiconductor switch is used instead of the mechanical switch, it is also conceivable that it is possible to suppress an increase in cost while avoiding contact failure. However, in the case of using the electronic switch, if power from the outside is not supplied to the new electronic control device due to disconnection or the like, the driving of the electronic switch becomes impossible, and as a result, there is a concern that it may not be possible to supply both gasoline and gaseous fuel.

Aspects according to the present invention have been made in view of the above circumstances and have an object to provide a fuel injection control device in which it is possible to avoid stopping of fuel supply to an engine even at a time of power discontinuity and it is possible to suppress an increase in cost.

In order to achieve such an object by solving the above problem, the present invention adopts the following aspects.

(A) According to an aspect of the present invention, there is provided a fuel injection control device which is provided with an input terminal to which a first pulse signal for driving a liquid fuel injection valve is input and an output terminal from which the first pulse signal is output, and converts the first pulse signal which is input from the input terminal to a second pulse signal for driving a gaseous fuel injection valve, including: a P-channel field-effect transistor interposed in a wiring which connects the input terminal and the output terminal; a switching control section which performs switching control of a state of the field-effect transistor; and a gate drive circuit which maintains the field-effect transistor in an ON state in a case where power supply to the switching control section is not performed.

(B) In the aspect described in the above (A), the gate drive circuit may include a capacitor which is interposed between a gate and a source of the field-effect transistor and maintains a voltage between the gate and the source of the field-effect transistor at a voltage at which the field-effect transistor enters the ON state, and a diode connected to the gate of the field-effect transistor so as to be reverse-biased by the voltage which is maintained by the capacitor, in a case where power supply to the switching control section is not performed.

(C) In the aspect described in the above (B), the fuel injection control device may further include: a driver circuit which connects the gate of the field-effect transistor to the source in a case where the switching control section controls the field-effect transistor such that it enters an OFF state.

(D) In the aspect described in any one of the above (A) to (C), the fuel injection control device may further include: a protection circuit which is connected between a source and a drain of the field-effect transistor and protects the field-effect transistor when a state of the field-effect transistor is switched.

(E) In the aspect described in the above (D), the protection circuit may be a Zener diode having an anode which is connected to the drain of the field-effect transistor, and a cathode which is connected to the source of the field-effect transistor.

According to the above aspects of the present invention, the P-channel field-effect transistor is interposed in the wiring which connects the input terminal to which the first pulse signal for driving a liquid fuel injection valve is input and the output terminal from which the first pulse signal is output, and in a case where power supply to the switching control section which performs switching control of the state of the field-effect transistor is not performed, the field-effect transistor is maintained in the ON state by the gate drive circuit, and therefore, there is the effect that it is possible to avoid stopping of fuel supply to an engine even at the time of power discontinuity.

Further, according to the above aspects of the present invention, the P-channel field-effect transistor is interposed between the input terminal and the output terminal, and thus it is not necessary to use an expensive switch with measures of applying siloxane thereto, as in the related art, and therefore, there is an effect that it is possible to provide a fuel injection control device in which it is possible to avoid stopping of fuel supply to an engine at the time of power discontinuity, while suppressing an increase in cost.

DETAILED DESCRIPTION OF THE INVENTION

Figure 1:
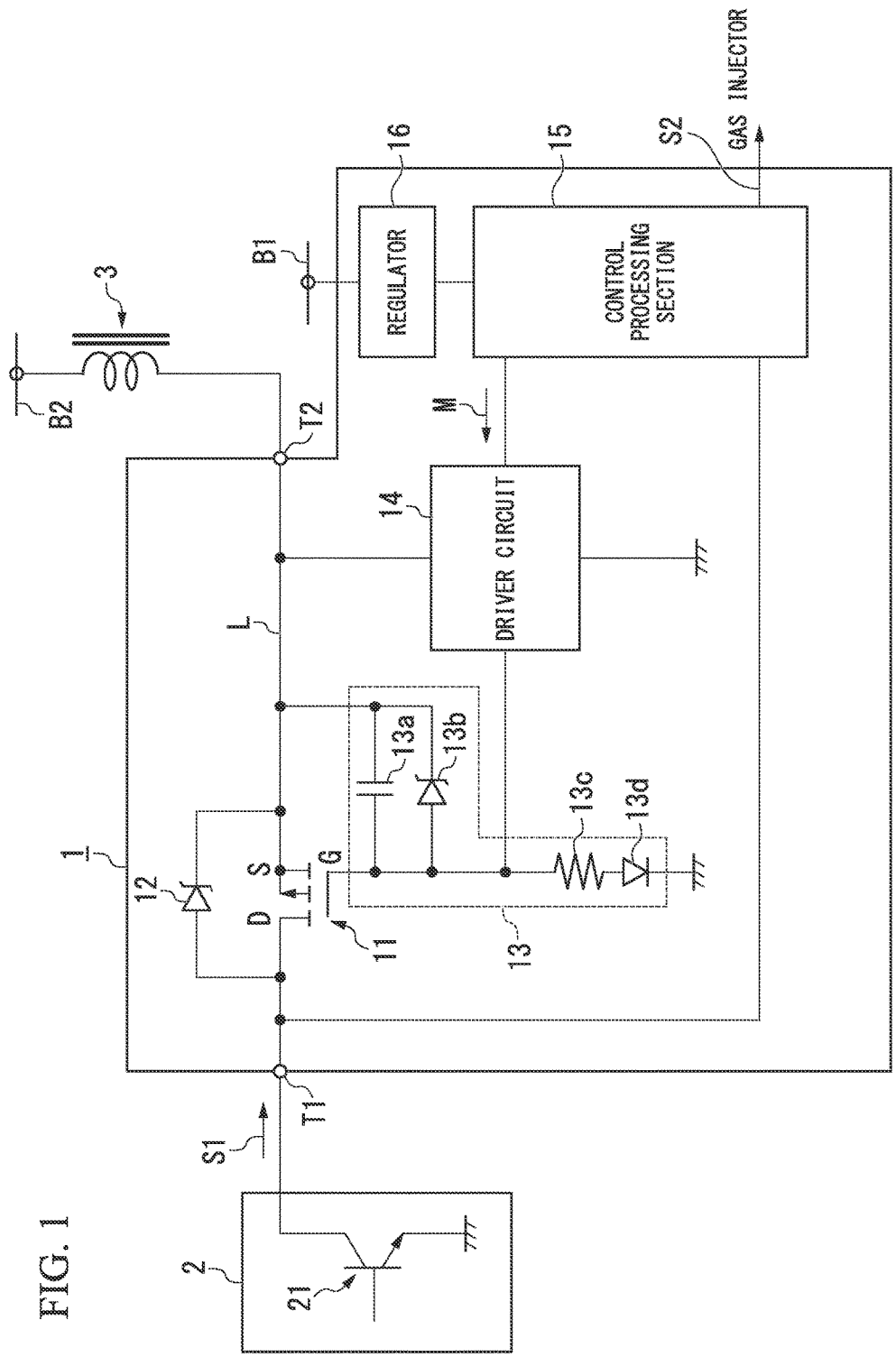
FIG. 1 is a diagram showing the configuration of a main section of a fuel injection control device according to an embodiment of the present invention.

Hereinafter, a fuel injection control device according to an embodiment of the present invention will be described in detail with reference to the drawings. FIG. 1 is a diagram showing the configuration of a main section of a fuel injection control device according to an embodiment of the present invention.

As shown in FIG. 1, a gas ECU 1 as the fuel injection control device is provided with an input terminal T1 to which a gasoline ECU 2 is connected, and an output terminal T2 to which a gasoline injector 3 (a liquid fuel injection valve) is connected, and is operated by electric power which is supplied from an external power supply B1.

The gas ECU 1 outputs a gasoline pulse signal S1 (a first pulse signal) from the gasoline ECU 2, which is input through the input terminal T1, to the gasoline injector 3 through the output terminal T2 when supplying gasoline to an engine. In contrast, when supplying gaseous fuel to the engine, the gas ECU 1 converts the gasoline pulse signal S1 which is input through the input terminal T1 to a gas pulse signal S2 (a second pulse signal) for driving a gas injector (a gaseous fuel injection valve) (not shown) and then outputs the gas pulse signal S2 to the gas injector The gasoline pulse signal S1 is a pulse signal which has a pulse width corresponding to an injection quantity of gasoline and is used in order to drive the gasoline injector 3. In contrast, the gas pulse signal S2 is a pulse signal which has a pulse width suitable for gaseous fuel and is used in order to drive the gas injector. The gasoline pulse signal S1 and the gas pulse signal S2 are generated based on the number of cylinders of the engine. However, in this embodiment, in order to simplify the description, one of each of the gasoline pulse signal S1 and the gas pulse signal S2 are generated.

Here, the gasoline ECU 2 generates the gasoline pulse signal S1 which drives the gasoline injector 3 based on an operating state of the engine, thereby controlling an injection quantity and an injection timing of gasoline from the gasoline injector 3. In addition, in FIG. 1, a drive circuit 21 for generating the gasoline pulse signal S1 is simplified and shown. The drive circuit 21 is a circuit which grounds the input terminal T1 of the gas ECU 1 (generates the gasoline pulse signal S1 having a voltage of 0 [V]) in a case of injecting gasoline from the gasoline injector 3.

The gasoline injector 3 is connected to an external power supply B2 and injects gasoline which is supplied to the engine, according to the gasoline pulse signal S1 which is output from the output terminal T2 of the gas ECU 1. Specifically, the gasoline injector 3 is operated by electric power which is supplied from the external power supply B2, thereby injecting gasoline, in a case where the voltage of the gasoline pulse signal S1 is 0 [V], and does not inject gasoline in a case where the voltage of the gasoline pulse signal S1 is a predetermined voltage other than 0 [V] (for example, in a case where the voltage of the gasoline pulse signal S1 is the same voltage as that of the external power supply B2). In addition, the voltages of the external power supplies B1 and B2 are set to be V [V].

As shown in FIG. 1, the gas ECU 1 is provided with a P-channel FET (a field-effect transistor) 11, a Zener diode 12 (a protection circuit), a gate drive circuit 13, a driver circuit 14, a control processing section 15 (a switching control section), and a regulator 16. The P-channel FET 11 is interposed in wiring L which connects the input terminal T1 and the output terminal T2, and enters an ON state or an OFF state by the control of the control processing section 15, thereby making the input terminal T1 and the output terminal T2 be in a connected state or a disconnected state.

Specifically, the P-channel FET 11 enters the ON state (making the input terminal T1 and the output terminal T2 be in the connected state) in a case of supplying gasoline to the engine and enters the OFF state (making the input terminal T1 and the output terminal T2 be in the disconnected state) in a case of supplying gaseous fuel to the engine.

That is, the P-channel FET 11 is provided in order to switch between whether or not to output the gasoline pulse signal S1 which is supplied through the input terminal T1, from the output terminal T2. In addition, the P-channel FET 11 is interposed in the wiring L such that a drain D is connected to the input terminal T1 and a source S is connected to the output terminal T2.

The Zener diode 12 is a protection circuit which is connected between the source S and the drain D of the P-channel FET 11 and protects the P-channel FET 11 in a case where the state of the P-channel FET 11 is switched. Specifically, the Zener diode 12 has an anode which is connected to the drain D of the P-channel FET 11, and a cathode which is connected to the source S of the P-channel FET 11. The Zener diode 12 is provided in order to protect the P-channel FET 11 from a counter-electromotive force which occurs in the gasoline injector 3 when the P-channel FET 11 is switched from the ON state to the OFF state.

The gate drive circuit 13 is a circuit which maintains the P-channel FET 11 in the ON state in a case where power supply from the external power supply B1 to the control processing section 15 is not performed due to, for example, disconnection or the like. The gate drive circuit 13 is provided in order to prevent the situation that both the gasoline and the gaseous fuel cannot be supplied to the engine, by enabling the supply of the gasoline pulse signal S1 to the gasoline injector 3 by maintaining the P-channel FET 11 in the ON state at the time of power discontinuity.

Specifically, the gate drive circuit 13 is provided with a capacitor 13a, a Zener diode 13b, a resistor 13c, and a diode 13d. The capacitor 13a is interposed between a gate G and the source S of the P-channel FET 11 and maintains the voltage between the gate G and the source S of the P-channel FET 11 at a voltage at which the P-channel FET 11 enters the ON state. Specifically, the capacitor 13a maintains the voltage such that the voltage of the gate G with respect to the source S of the P-channel FET 11 becomes −V [V]. The Zener diode 13b is connected in parallel to the capacitor 13a and provided in order to protect the P-channel FET 11 from a counter-electromotive force which occurs in the gasoline injector 3.

The resistor 13c is connected, at one end, to the gate G of the P-channel FET 11 and connected, at the other end, to an anode of the diode 13d. The diode 13d has the anode which is connected to the other end of the resistor 13c, and a cathode which is grounded. The diode 13d is connected to the gate G of the P-channel FET 11 through the resistor 13c so as to be reverse-biased by the voltage which is maintained by the capacitor 13a, in a case where power supply from the external power supply B1 to the control processing section 15 is not performed.

Here, as described above, in a case where power supply from the external power supply B1 to the control processing section 15 is not performed, due to the capacitor 13a, the voltage of the gate G of the P-channel FET 11 is maintained so as to be −V [V] with respect to the source S. For this reason, the diode 13d is reverse-biased at V [V]. In this manner, reverse-biasing the diode 13d is for preventing electric charge stored in the capacitor 13a from being discharged to the outside in a case where power supply from the external power supply B1 to the control processing section 15 is not performed. In this manner, the electric discharge of electric charge is prevented by the diode 13d, whereby in the capacitor 13a, the voltage at which the P-channel FET 11 enters the ON state is maintained.

The driver circuit 14 drives the P-channel FET 11 under the control of the control processing section 15. Specifically, the driver circuit 14 makes the voltage of the gate G of the P-channel FET 11 become 0 [V] in a state where the gasoline pulse signal S1 is not input, in a case where a mode switching signal M which is output from the control processing section 15 is at an "L" (low) level. In addition, the electric potential of the gate G of the P-channel FET 11 changes according to the presence or absence of the gasoline pulse signal S1, and therefore, the electric potential of the gate G of the P-channel FET 11 is not fixed to 0 [V].

Further, the driver circuit 14 makes the gate G of the P-channel FET 11 be connected to the source S in a case where the mode switching signal M which is output from the control processing section 15 is at an "H" (high) level. That is, the gate G and the source S of the P-channel FET 11 are short-circuited, and thus the electric charge stored in the capacitor 13a is discharged. In addition, if the electric charge stored in the capacitor 13a is discharged, the P-channel FET 11 enters the OFF state.

The control processing section 15 is provided with a central processing unit (CPU), a memory, an input-output interface, and the like and performs switching control between the ON state and the OFF stage of the P-channel FET 11. Specifically, in a case of supplying gasoline to the engine, the control processing section 15 places the mode switching signal M in the "L" level, thereby making the P-channel FET 11 be in the ON state. In contrast, in a case of supplying gaseous fuel to the engine, the control processing section 15 makes the mode switching signal M be at the "H" level, thereby making the P-channel FET 11 be in the OFF state.

Further, in a case of supplying gasoline to the engine, the control processing section 15 converts the gasoline pulse signal S1 (the gasoline pulse signal S1 which is branched at a stage previous to the P-channel FET 11) to the gas pulse signal S2 and then outputs the gas pulse signal S2 to the gas injector (not shown). The regulator 16 converts electric power (voltage V [V]) which is supplied from the external power supply B1 to a voltage suitable for the control processing section 15 and then supplies the voltage to the control processing section 15.

Figure 2:
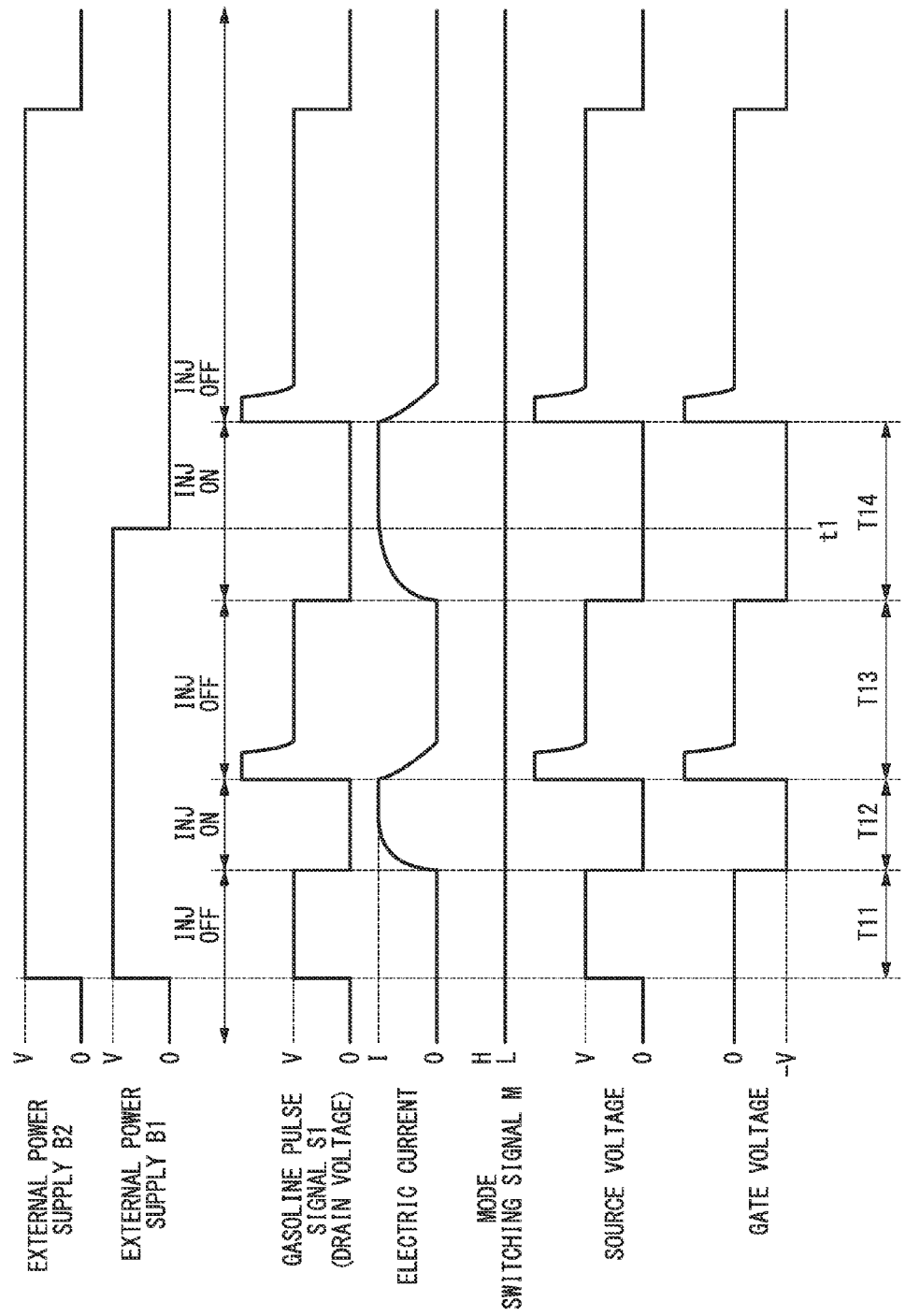
FIG. 2 is a timing chart for describing an operation of a gas ECU.
Figure 3:
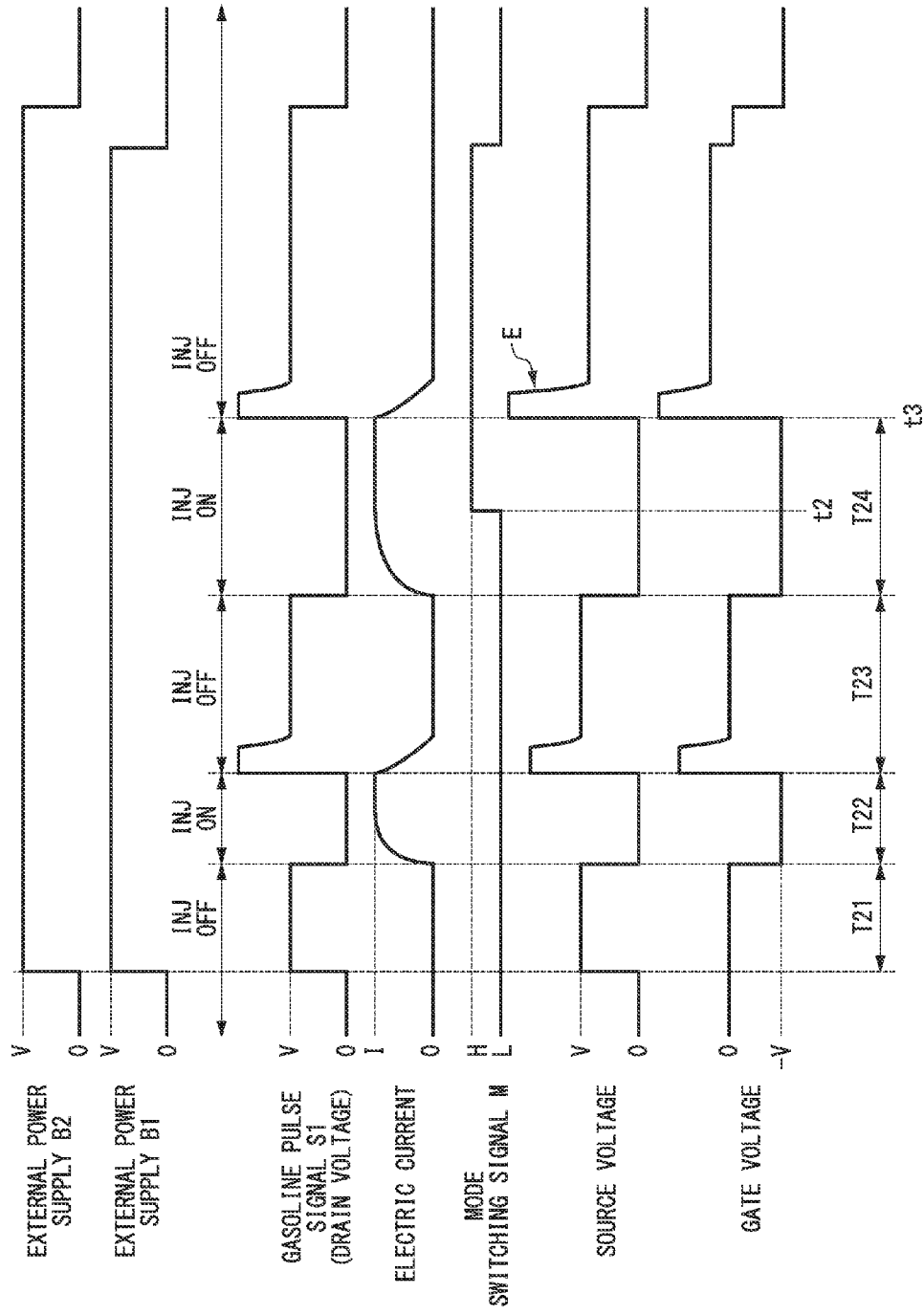
FIG. 3 is a timing chart for describing an operation of the gas ECU.

Next, an operation of the gas ECU 1 in the above configuration will be described. FIGS. 2 and 3 are timing charts for describing the operation of the gas ECU 1. In addition, the operation of the gas ECU 1 is classified roughly into an operation in a case of supplying gasoline to the engine (an operation at the time of a gasoline operation) and an operation in a case of supplying gaseous fuel to the engine (an operation at the time of a gas operation), and therefore, in the following, these operations will be described in order.

(Operation at the Time of Gasoline Operation)

In a case where as current fuel, gasoline is selected by a fuel selector switch (not shown), the mode switching signal M of the "L" level is output from the control processing section 15 of the gas ECU 1 (refer to the "mode switching signal M" shown in FIG. 2). If the mode switching signal M is input to the driver circuit 14, the voltage of the gate G of the P-channel FET 11 becomes 0 [V] due to the driver circuit 14 (refer to a period T11 of the "gate voltage" shown in FIG. 2).

Here, in a case where the gasoline pulse signal S1 from the gasoline ECU 2 is not input to the gas ECU 1 through the input terminal T1, the voltage of the source S of the P-channel FET 11 becomes the voltage V [V] of the external power supply B2 (refer to the period T11 of the "source voltage" shown in FIG. 2). In addition, a case where the gasoline pulse signal S1 is not input to the gas ECU 1 is a case where the input terminal T1 is not grounded by the drive circuit 21 and thus the voltage of the gasoline pulse signal S1 is V [V] (refer to the period T11 of the "gasoline pulse signal S1 (drain voltage)" shown in FIG. 2).

Due to this, the voltage between the gate G and the source S of the P-channel FET 11 becomes V [V]. The voltage is sufficiently larger than the threshold voltage necessary to place the P-channel FET 11 in the ON state, and therefore, the P-channel FET 11 enters the ON state, and thus the input terminal T1 and the output terminal T2 are in a connected state. Further, since the capacitor 13a configuring the gate drive circuit 13 is connected between the gate G and the source S of the P-channel FET 11, the voltage between the electrodes of the capacitor 13a also becomes V [V].

In addition, in the period T11 in FIG. 2, although the P-channel FET 11 is in the ON state, the gasoline pulse signal S1 from the gasoline ECU 2 is not input to the gas ECU 1 through the input terminal T1. For this reason, an electric current does not flow to the gasoline injector 3 (refer to the period T11 of the "electric current" shown in FIG. 2), and thus gasoline is not injected from the gasoline injector 3. In addition, in FIG. 2, the flow of the electric current toward the input terminal T1 from the output terminal T2 shall be a positive direction.

Next, if the gasoline pulse signal S1 from the gasoline ECU 2 is input to the gas ECU 1 through the input terminal T1, the voltages of the source S and the drain D of the P-channel FET 11 become 0 [V] (refer to a period T12 of the "source voltage" and the "gasoline pulse signal S1 (drain voltage)" shown in FIG. 2). Here, the voltage between the source S and the gate G of the P-channel FET 11 is maintained at V [V] by the capacitor 13a, and therefore, if the voltage of the source S of the P-channel FET 11 becomes 0 [V], the voltage of the gate G becomes −V [V] (refer to the period T12 of the "gate voltage" shown in FIG. 2) and the P-channel FET 11 is maintained in the ON state.

In addition, in the period T12 in FIG. 2, when the P-channel FET 11 is in the ON state, the gasoline pulse signal S1 from the gasoline ECU 2 is input to the gas ECU 1 through the input terminal T1, and therefore, an electric current flows to the gasoline injector 3 (refer to the period T12 of the "electric current" shown in FIG. 2). Due to this, the gasoline injector 3 operates, and thus gasoline is injected and supplied to the engine.

Subsequently, if the gasoline pulse signal S1 from the gasoline ECU 2 is stopped, the voltages of the source S and the drain D of the P-channel FET 11 become the voltage V [V] of the external power supply B2 (refer to a period T13 of the "source voltage" and the "gasoline pulse signal S1 (drain voltage)" shown in FIG. 2). At this time, the gasoline pulse signal S1 is stopped, whereby an electric current flowing to the gasoline injector 3 rapidly decreases (refer to a period T13 of the "electric current" shown in FIG. 2). Due to this, in the gasoline injector 3, a large counter-electromotive force occurs. However, the counter-electromotive force is limited by the Zener diode 13b, and thus the P-channel FET 11 is prevented from being damaged.

Here, the voltage between the source S and the gate G of the P-channel FET 11 is maintained at V [V] by the capacitor 13a. For this reason, if the voltage of the source S of the P-channel FET 11 becomes V [V], although the voltage of the gate G changes to 0 [V] (refer to the period T13 of the "gate voltage" shown in FIG. 2), the P-channel FET 11 is maintained in the ON state. In addition, in the period T13 in FIG. 2, the gasoline pulse signal S1 from the gasoline ECU 2 is stopped, and therefore, gasoline is not injected from the gasoline injector 3.

If the gasoline pulse signal S1 from the gasoline ECU 2 is input to the gas ECU 1 through the input terminal T1 again, similar to the period T11 in FIG. 2, the voltages of the source S and the drain D of the P-channel FET 11 become 0 [V] and the voltage of the gate G become −V [V] (refer to a period T14 of the "source voltage", the "gasoline pulse signal S1 (drain voltage)", and the "gate voltage" shown in FIG. 2). Then, an electric current flows to the gasoline injector 3 (refer to the period T14 of the "electric current" shown in FIG. 2). Due to this, the gasoline injector 3 operates, and thus gasoline is injected and supplied to the engine.

Here, at time t1 in FIG. 2, power supply from the external power supply B1 to the control processing section 15 is assumed not to be performed (refer to the "external power supply B1" shown in FIG. 2). Then, although an operation of the control processing section 15 is stopped, the voltage between the source S and the gate G of the P-channel FET 11 is maintained at V [V] by the capacitor 13a, and furthermore, the diode 13d is reverse-biased by the voltage which is maintained by the capacitor 13a, and therefore, the P-channel FET 11 remains in the ON state. Due to this, even if power supply from the external power supply B1 to the control processing section 15 is not performed, the supply of the gasoline pulse signal S1 to the gasoline injector 3 is continued, and thus the supply of gasoline to the engine is continued.

(Operation at the Time of Gas Operation)

In a case where as current fuel, gaseous fuel is selected by the fuel selector switch (not shown), the mode switching signal M of the "H" level is output from the control processing section 15 of the gas ECU 1. If the mode switching signal M is input to the driver circuit 14, the gate G of the P-channel FET 11 is connected to the source S by the driver circuit 14. Then, the electric charge stored in the capacitor 13a is discharged, and thus the electric potentials of the gate G and the source S of the P-channel FET 11 become the same, and therefore, the P-channel FET 11 enters the OFF state.

If the gasoline pulse signal S1 from the gasoline ECU 2 is input to the gas ECU 1 through the input terminal T1 when the P-channel FET 11 is in the OFF state, the gasoline pulse signal S1 is branched at the stage previous to the P-channel FET 11 and input to the control processing section 15. The gasoline pulse signal S1 is converted to the gas pulse signal S2 at the control processing section 15 and then output to the gas injector (not shown).

Due to this, the gas injector (not shown) is driven, and thus gaseous fuel is supplied to the engine.

Here, a case where while the supply of gasoline to the engine is being performed, the fuel selector switch (not shown) is operated, and thus gaseous fuel is selected as current fuel, is considered. Specifically, a case where an operation for selecting gaseous fuel is performed at time t2 in a period T24 after periods T21 to T23 (periods in which the same operations as those in the periods T11 to T13 shown in FIG. 2 are performed) shown in FIG. 3 is considered. In addition, usually, the selection of fuel to be supplied to the engine is performed in a state in which fuel supply to the engine has not been performed. For this reason, it can be said that the above operation is an abnormal operation.

If such an abnormal operation is made, while the gasoline pulse signal S1 is being supplied to the gasoline injector 3 (refer to the period T24 of the "gasoline pulse signal S1 (drain voltage)" shown in FIG. 3), the mode switching signal M of the "H" level is output from the control processing section 15 of the gas ECU 1 (time t2). Then, at the point in time when the period T24 ends (time t3), an extremely large counter-electromotive force E (theoretically infinite) occurs in the gasoline injector 3 and is applied to the source S of the P-channel FET 11.

Here, the Zener diode 12 is interposed between the source S and the drain D of the P-channel FET 11 and the counter-electromotive force E which is applied to the source S of the P-channel FET 11 is clamped to a voltage at which damage to the P-channel FET 11 does not occur, by the Zener diode 12 (refer to FIG. 3). In this manner, even if an abnormal operation is made, the P-channel FET 11 is protected and is not damaged.

As described above, in this embodiment, the P-channel FET 11 is interposed in the wiring L between the input terminal T1 to which the gasoline pulse signal S1 is input and the output terminal T2 from which the gasoline pulse signal S1 is output, and in a case where power supply to the control processing section 15 is not performed, the P-channel FET 11 is maintained in the ON state by the gate drive circuit 13, and therefore, it is possible to prevent the situation that both gasoline and gaseous fuel cannot be supplied to the engine. Due to this, even if power supply to the control processing section 15 is not performed, gasoline supply to the engine is continued, and therefore, saving traveling becomes possible.

Further, in this embodiment, the P-channel FET 11 is interposed in the wiring L between the input terminal T1 to which the gasoline pulse signal S1 is input and the output terminal T2 from which the gasoline pulse signal S1 is output, and thus it is not necessary to use an expensive switch with measure of applying siloxane thereto, as in the related art. For this reason, it is possible to realize the gas ECU 1 in which it is possible to avoid stopping of fuel supply to the engine at the time of power discontinuity, while suppressing an increase in cost.

The fuel injection control device according to an embodiment of the present invention has been described above. However, the present invention is not limited to the above-described embodiment and changes can be freely made within the scope of the present invention. For example, in the above-described embodiment, as liquid fuel, gasoline has been taken as an example. However, the liquid fuel may be alcohol or a mixed fuel of alcohol and gasoline. Further, the gaseous fuel may be liquefied petroleum gas (LPG) other than compressed natural gas (CNG).

INDUSTRIAL APPLICABILITY

According to the present invention, it becomes possible to provide a fuel injection control device in which it is possible to avoid stopping of fuel supply to the engine even at the time of power discontinuity and it is possible to suppress an increase in cost.

What is claimed is:

1. A fuel injection control device which is provided with an input terminal to which a first pulse signal for driving a liquid fuel injection valve is input and an output terminal from which the first pulse signal is output, and converts the first pulse signal which is input from the input terminal to a second pulse signal for driving a gaseous fuel injection valve, the device comprising:
    a P-channel field-effect transistor interposed in a wiring which connects the input terminal and the output terminal;
    an electronic controller configured to switch between an operation of outputting the first pulse signal from the output terminal and an operation of converting the first pulse signal to the second pulse signal by performing switching control between an ON state and an OFF state of the field-effect transistor;
    a gate drive circuit which maintains the field-effect transistor in the ON state in a case where an operation of the electronic controller is stopped, and
    a protection circuit which is connected between a source and a drain of the field-effect transistor and protects the field-effect transistor when a state of the field-effect transistor is switched,
    where the protection circuit is a Zener diode having an anode which is connected to the drain of the field-effect transistor, and a cathode which is connected to the source of the field-effect transistor.

2. The fuel injection control device according to claim 1, wherein the gate drive circuit includes a capacitor which is interposed between a gate and a source of the field-effect transistor and maintains a voltage between the gate and the source of the field-effect transistor at a voltage at which the field-effect transistor enters the ON state, and
    a diode connected to the gate of the field-effect transistor so as to be reverse-biased by the voltage which is maintained by the capacitor, in a case where an operation of the electronic controller is stopped.

3. The fuel injection control device according to claim 2, further comprising: a driver circuit which short-circuits the gate and the source of the field-effect transistor in a case where the electronic controller controls the field-effect transistor such that it enters the OFF state.

4. The fuel injection control device according to claim 2, further comprising: a protection circuit which is connected between a source and a drain of the field-effect transistor and protects the field-effect transistor when a state of the field-effect transistor is switched.

5. The fuel injection control device according to claim 3, further comprising: a protection circuit which is connected between a source and a drain of the field-effect transistor and protects the field-effect transistor when a state of the field-effect transistor is switched.

* * * * *